Sept. 15, 1964     R. S. BELLAS     3,148,417
BIRD PROOFING DEVICE
Filed Sept. 20, 1960
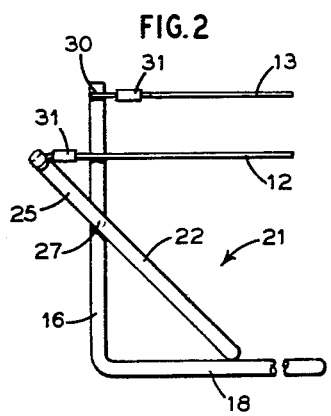
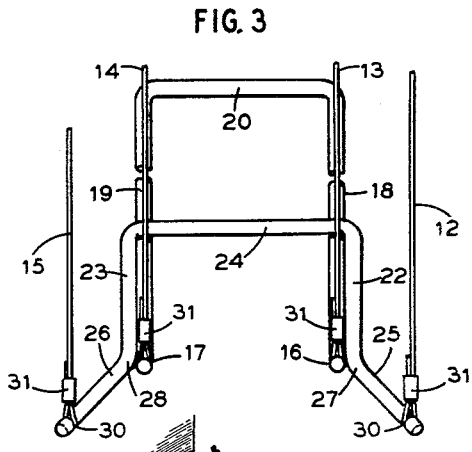
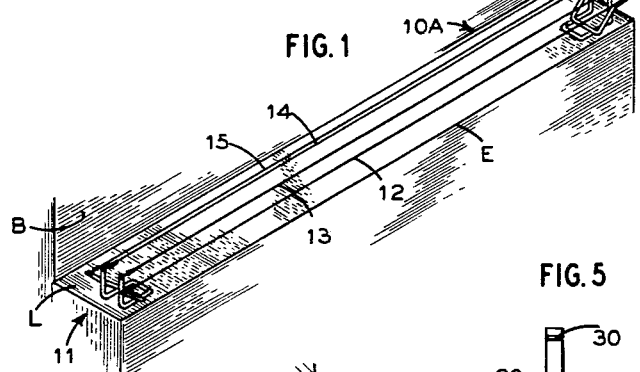
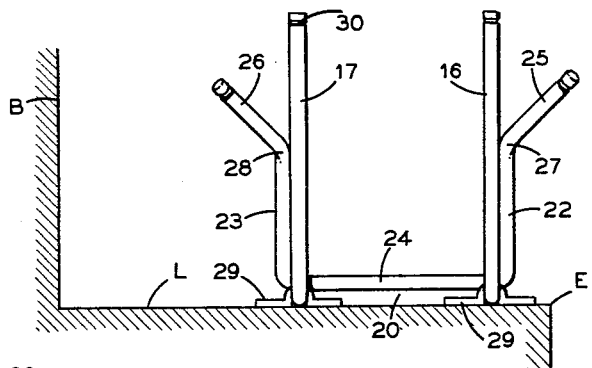
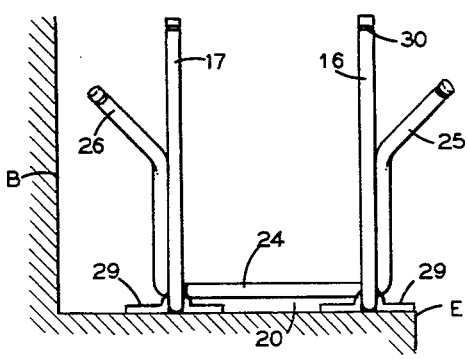
INVENTOR.
Roy S. Bellas
BY
S.C. Yuter
ATTORNEY United States Patent Office 3,148,417
Patented Sept. 15, 1964

3,148,417
BIRD PROOFING DEVICE
Roy S. Bellas, 3807 10th Ave., New York, N.Y.
Filed Sept. 20, 1960, Ser. No. 57,216
1 Claim. (Cl. 20—1)

This invention relates to a bird proofing device, and more particularly, concerns devices applicable to ledges, sills and the like of buildings, statues and other structures, to protect the same against birds.

A number of expedients have been suggested to protect buildings from the nuisance occasioned by birds alighting on ledges, sills and the like. The suggested solutions to the problem have in large part been found to be deficient in one or more respects so as to render the same impractical. Thus, in many cases, the costs are so high as to make the same economically infeasible. In other cases, the devices suggested are selective with respect to the size of the bird and do not cover an extended range of sizes.

Accordingly, one object of this invention is to provide an improved birdproofing device which is of relatively simple construction and economical to manufacture and to install.

Another object of this invention is to provide an improved birdproofing device which includes an arrangement of parts operative to prevent birds from alighting on surfaces protected by the same, irrespective of the size of the bird.

Other objects of this invention will in part be obvious and in part hereinafter pointed out.

In the drawing,

FIG. 1 is a perspective view of a birdproofing device embodying the invention;

FIG. 2 is a side view thereof;

FIG. 3 is a top plan view thereof;

FIG. 4 is an end view illustrating one form of installation.

FIG. 5 is an end view similar to that of FIG. 4 showing another form of installation.

Essentially, in accordance with the instant invention, means is provided for protecting ledges, sills and other projections on buildings against birds such as pigeons, crows, sea-gulls or the like, from alighting on the same. Such means comprises a plurality of taut, substantially parallel strands supported by suitable bracket means and retained in a predetermined three-dimensional spacing pattern.

Thus, as shown in the drawing, 10A designates a bird proofing system embodying the invention. The same comprises a pair of similar supporting brackets 11, 11A adapted to be disposed in longitudinally aligned relation on a surface to be protected, such as a ledge L of a building B. Brackets 11, 11A at a suitable spacing are adapted to support a plurality of strands 12, 13, 14 and 15 in a taut and substantially parallel condition.

Brackets 11, 11A may be made of bent steel rod or other suitable material of selected diameter to provide requisite strength. Bracket 11 comprises a single rod bent into generally L shaped form with a pair of upstanding portions 16, 17; horizontal portions 18, 19 extending from the lower ends of portions 16, 17 respectively; and a transverse portion 20 interconnecting horizontal portions 18, 19.

Each of brackets 11, 11A further includes a combination reinforcement and strand support in the form of a bent rod member 21 of generally U shape and comprising parallel arm portions 22, 23 connected at their lower ends by a transverse portion 24. The arm portions 22, 23 terminate in outwardly extending angular projections 25, 26, whose ends are below the ends of upstanding portions 16, 17.

Members 21 interconnect portions 16, 17 with portions 18, 19 by their transverse portions 24 straddling horizontal portions 18, 19 and welded or otherwise secured thereto while arm portions 22, 23 are inclined upwardly toward the upper ends of upstanding portions 16, 17 and secured by welding thereto at the junctures 27, 28 of member portions 22, 25; 23, 26.

Brackets 11, 11A are fixed in place on ledge L at a suitable spacing by suitable means such as hold down plates 29, with their upstanding portions 16, 17 in respective longitudinal alignment. Strands 12–15 are stretched between brackets 11, 11A and secured at their opposite ends to the upper ends of upstanding portions 16, 17 and the outer ends of projections 25, 26. Strands 12–15 may be formed of nylon, steel or other suitable material which will retain a taut condition.

Upstanding portions 16, 17 and projections 25, 26 are grooved at their ends as at 30 to receive the looped ends of strands 12–15; metal sleeves 31 receiving the looped ends of said strands and being crimped to secure the strand ends in place.

The brackets 11, 11A are dimensioned so as to locate strands 13, 14 at a level of from about 2½ to about 6½" above the surface of ledge L and preferably at a level of about 4"; said strands 13, 14 having a transverse spacing of from about 1¼ to about 3" and a preferable spacing of about 2".

The strands 12, 15 are disposed at a lower level than strands 13, 14, being located at a level of from about 1½ to about 4½" and preferably at a level of about 3". Strands 12, 15 are laterally spaced from strands 13, 14 respectively at a distance of from about ¾ to about 1½" and preferably at a distance of about 1".

Assuming that ledge L has a transverse width of about 4" then brackets 11, 11A are so disposed thereon as to locate strand 12 in forwardly projecting relation to edge E of ledge L, as shown in FIG. 4. Since strands 12, 15 have a transverse spacing of about 4" in the preferred form, strand 15 will be spaced from building wall W by an amount equal to the projection of strand 12 with respect to ledge edge E. For somewhat wider ledges, either the brackets 11, 11A may be slightly varied in their transverse dimensions, or the brackets may be so located as to bring the strand 12 in substantial alignment with edge E, as shown in FIG. 5. However, it is preferred that strand 12 have some projection beyond edge E.

For ledges of substantial width, the devices disclosed herein may be used in parallel rows to insure adequate coverage of the ledge width and to prevent access by the birds to rear portions of such ledges.

It has been found that with the arrangement of the strands at upper and lower levels, together with a suitable transverse spacing; effective barrier means is provided which prevents birds such as pigeons or the like from alighting on ledge L. Thus, the strands 12–15 prevent the bird from obtaining a footing either below, above, between or behind the strands. Furthermore, the strand arrangement has been found to be effective when a bird approaches ledge L at an angle or from above.

Brackets 11, 11A may be at various spacings on building ledge L, in accordance with the tensile strength of the strands 12–15. Thus, the brackets have been placed at spacings ranging from 2.5 to 6.0 ft. Obviously, a pair of brackets 11, 11A and associated strands 12–15 is placed at repeating intervals of the length of ledge L to be protected.

As various changes might be made in the embodiments of the invention herein disclosed without departing from the spirit thereof, it is understood that all matter herein disclosed is illustrative and not limiting except as set forth in the appended claim.

What is claimed is:

A bird proofing device comprising a pair of strand mounting brackets and a plurality of strands, each bracket comprising a bent rod including a pair of horizontal arm portions, a pair of vertical arm portions respectively extending upwardly from one end of said horizontal arm portions, a transverse portion connecting the other ends of said horizontal arm portions, and reinforcing means angularly related to and connecting said vertical and horizontal arm portions, said reinforcing means including a portion projecting angularly and laterally relative to said vertical arm portions, the terminal end of said projecting portion being below the upper end of said vertical arm portions, a pair of said strands being engaged at the opposite ends thereof by the upper ends of the respective vertical arm portions and a third strand being engaged at the opposite ends thereof at the terminal ends of the angularly projecting portions of said reinforcing means.

References Cited in the file of this patent

UNITED STATES PATENTS

| | | |
|---|---|---|
| 1,067,377 | Schisler | July 15, 1913 |
| 1,312,576 | Rea | Aug. 12, 1919 |
| 1,995,574 | Metz | Mar. 26, 1935 |
| 2,080,672 | Perrich | May 18, 1937 |

OTHER REFERENCES

Popular Mechanics, October 1939, page 631.